Nov. 1, 1932.　　　A. LAVOIE　　　1,886,203
ANIMAL TRAP
Filed June 16, 1931
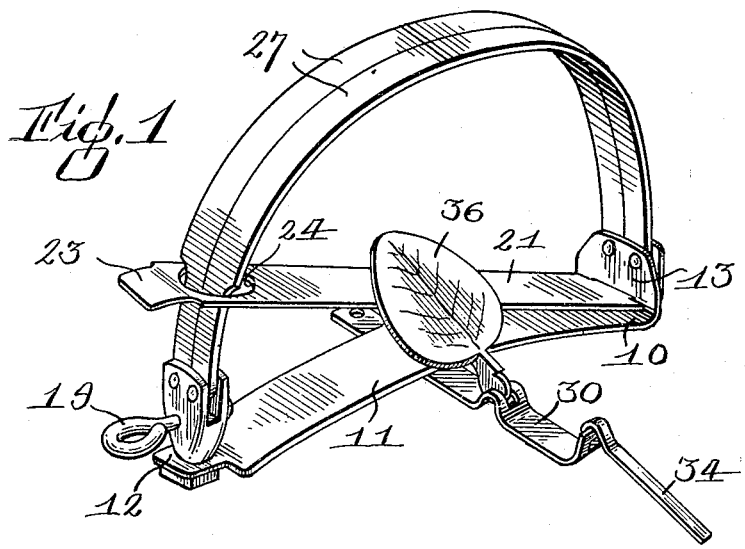
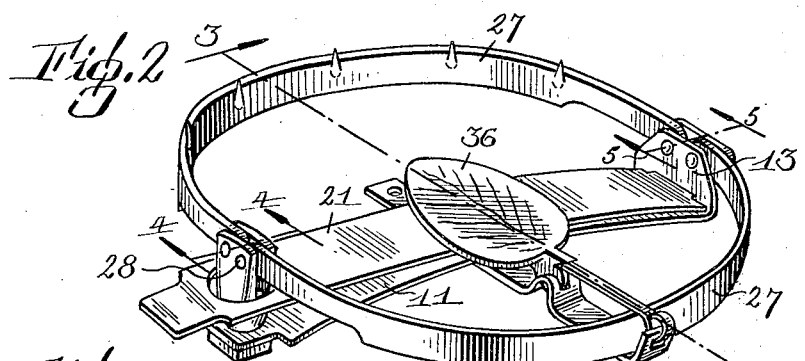
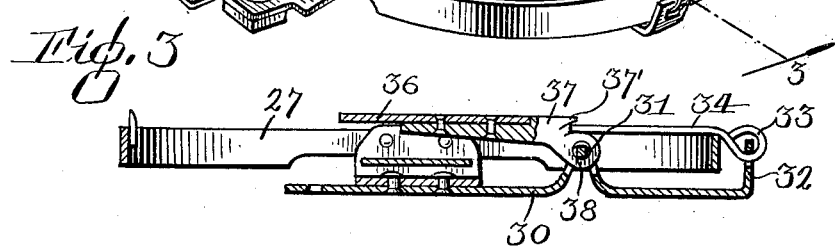
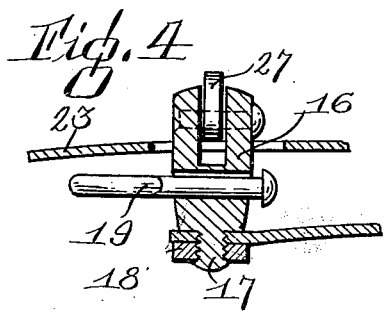
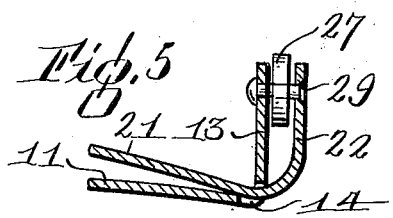
Alexis Lavoie Inventor
By *Marion & Marion*
Attorneys Patented Nov. 1, 1932

1,886,203

UNITED STATES PATENT OFFICE

ALEXIS LAVOIE, OF ST. GABRIEL EAST, QUEBEC, CANADA

ANIMAL TRAP

Application filed June 16, 1931. Serial No. 544,881.

The present invention relates to improvements in animal traps and has for its primary object the provision of a compact trap provided with an operating treadle formed to simulate a natural object.

A further object of the invention is the provision of a trap of the swinging jaw type embodying an actuating spring extending transversely over the base structure and within the compass of the trap.

Another object of the invention is the provision of a trap of the above character having a treadle or bait plate formed in simulation of a leaf, adapted to disguise the device.

Still another object of the invention is the provision of a trap of the above character which will be relatively simple and durable in construction and which will be effective and reliable in use.

Other objects and advantages of the invention will become apparent as the description progresses.

In the accompanying drawing forming a part of this specification and in which like reference characters are employed to designate corresponding parts throughout the same:—

Figure 1 is a perspective view of the improved trap in closed animal engaging position, Figure 2 is a similar view showing the trap in open, set position, Figure 3 is a transverse sectional view taken on the line 3—3 of Figure 2, Figure 4 is a sectional view taken on the line 4—4 of Figure 2, and Figure 5 is a similar view taken on the line 5—5 of Figure 2.

Referring to the drawing, wherein for the purpose of illustration is shown a preferred embodiment of the invention, the numeral 10 generally designates the base structure of the trap which embodies an elongated arched base bar 11 formed with an extension 12 at one end provided with a threaded aperture.

At the opposed end, the bar 11 is formed with an upturned bearing flange 13. At the juncture of the flange 13 with the body of the bar 11 is formed an elongated slot 14, the purpose of which will be later described.

Attached to the apertured end of the body bar 11 is an upstanding bifurcated bracket 16 formed at the lower end with a threaded shank 17 extended through the aperture in the extension 12 and rigidly connected with the bar by means of a nut 18. Through the intermediate portion of the bracket 16 is extended an eye bolt 19 for the connection of a fastening chain.

Extended over the bar 11 and conforming substantially to the contour thereof is a spring member embodying a flat elongated spring bar 21 provided at one end with a reduced extension which is inserted through the slot 14 and bent upwardly at the outer part to form an upstanding fastening flange 22. At the opposed end of the spring bar is formed a reduced tongue 23 adjacent which the bar is provided with a relatively large circular opening 24.

Pivotally connected with the opposed end portions of the base structure are a pair of co-operating arcuate jaws 27, each jaw having one end disposed in the bracket 16 and pivotally associated therewith through the medium of a rivet 28, while the opposed end is disposed between the bearing flange 13 and the upstanding flange 22 of the spring member and connected with a rivet 29 extending therebetween. The jaws are adapted to swing from horizontally disposed set positions to upwardly extending contacting position, actuated by the spring bar 21.

Rigidly connected with the central portion of the base bar 11 and extending at right angles thereto is a trigger bar 30 provided with an upwardly offset bearing pivot 31 intermediate its ends and with an upstanding tongue 32 at the outer end. The tongue 32 is apertured adjacent its upper extremity to accommodate a loop 33 formed on the outer end of a flat elongated trigger arm 34 formed of metal or other suitable rigid material.

A treadle 36, normally overlying the base bar and the spring bar 21, is connected with a pivot bracket 37, the bracket being provided with an apertured ear 38 rotatable about the pivot 31 of the trigger bar so that the bracket 37 and the treadle are operable to swing from a horizontal set position to an upwardly inclined position. Immediately above the ear 38 is formed a notch disposed to receive the free end of the trigger arm 34, as shown to advantage in Figure 3. The treadle forming plate 36 is formed in simulation of a natural leaf in order to disguise its function and thereby increase the effectiveness of the trap.

To set the trap, the spring bar 21 is adjusted to a position overlying the base bar 11 by engaging the projection 23 and sliding the movable end of the spring downwardly over the bracket 16. This movement of the spring will disengage the same from the jaws 27 so that the latter may be arranged in open, horizontal positions. The intermediate portion of one of the jaws will drop onto the outer portion of the trigger bar 30, inwardly of the tongue extension 32. The trigger arm 34 is then swung inwardly over the jaw and the inner end thereof disposed in engagement with the notch in the bracket 37, the lug 37' thereof releasably engaging the trigger arm when the treadle is slightly elevated so as to lock the jaw when the spring is liberated. When an animal depresses the treadle 36, causing downward movement of the bracket 37, the free end of the trigger arm is disengaged from the notch formed therein and the locked jaw, as well as the co-operating jaw, swung rapidly upward to closing positions by the tension of the spring bar which tends to assume its normal straight arrangement, as shown in Figure 1.

It is to be understood that the form of my invention herein shown and described is to be taken as a preferred example of the same, and that various changes as to the shape, size, and arrangement of parts may be resorted to without departing from the spirit of the invention or the scope of the subjoined claim.

Having thus described my invention, I claim:—

In an animal trap, an elongated arched base bar, having an upturned flange at one end thereof, a bracket detachably connected with the opposed end of the base bar, an elongated spring bar attached to one end of the base bar extending longitudinally over the base bar and provided with an aperture adjacent the opposed end engageable with a pair of jaws, a pair of co-operating jaws having an aperture in the ends thereof, pivot pins passed through the bracket, the flange of the base bar and the end of the spring respectively and through the aperture of the jaws to pivotally secure said jaws, a trigger bar, a treadle formed in simulation of a leaf pivotally connected with the trigger bar and adapted to normally overlie the base and spring bars, and a trigger pivoted to the trigger bar and detachably engageable with the treadle for releasably securing the jaws in set position.

In witness whereof I have hereunto set my hand.

ALEXIS LAVOIE.